US010742825B2

(12) United States Patent
Yamada

(10) Patent No.: US 10,742,825 B2
(45) Date of Patent: Aug. 11, 2020

(54) PRINT CONTROLLING DEVICE CONFIGURED TO DETECT AN OPERATION THERETO AND TRANSMIT PRINT DATA, PRINT CONTROLLING METHOD, AND NON-TRANSITORY COMPUTER-READABLE RECORDING MEDIUM STORING INSTRUCTIONS THEREFOR

(71) Applicant: BROTHER KOGYO KABUSHIKI KAISHA, Nagoya, Aichi (JP)

(72) Inventor: Jun Yamada, Aichi (JP)

(73) Assignee: Brother Kogyo Kabushiki Kaisha, Nagoya, Aichi (JP)

(*) Notice: Subject to any disclaimer, the term of this patent is extended or adjusted under 35 U.S.C. 154(b) by 1 day.

(21) Appl. No.: 15/936,537

(22) Filed: Mar. 27, 2018

(65) Prior Publication Data
US 2018/0288251 A1 Oct. 4, 2018

(30) Foreign Application Priority Data
Mar. 31, 2017 (JP) ................. 2017-072820

(51) Int. Cl.
H04N 1/00 (2006.01)
(52) U.S. Cl.
CPC ..... *H04N 1/00503* (2013.01); *H04N 1/00411* (2013.01); *H04N 1/00482* (2013.01)
(58) Field of Classification Search
None
See application file for complete search history.

(56) References Cited

U.S. PATENT DOCUMENTS

| 10,318,132 | B2* | 6/2019 | Sekiguchi | G06F 3/04817 |
| 2009/0296131 | A1* | 12/2009 | Yoshida | H04N 1/0035 358/1.15 |
| 2010/0253959 | A1* | 10/2010 | Kimoto | G03G 15/5016 358/1.9 |
| 2012/0304084 | A1* | 11/2012 | Kim | G06F 3/0486 715/762 |
| 2015/0205498 | A1* | 7/2015 | Levi | G06F 3/04842 715/763 |

FOREIGN PATENT DOCUMENTS

| JP | 2014-519106 A | 8/2014 |
| JP | 2015-219558 A | 12/2015 |

* cited by examiner

*Primary Examiner* — Mohammad H Ghayour
*Assistant Examiner* — Pawan Dhingra
(74) *Attorney, Agent, or Firm* — Scully, Scott, Murphy & Presser, PC

(57) ABSTRACT

A non-transitory computer-readable recording medium containing computer-readable instructions which cause an information processing device, when executed by a controller thereof, to obtain print file including print object data in accordance with a particular obtaining condition in response to application of the second operation to the start-up icon, display file information which is at least a part of information included in the print file as obtained, create, in response to a pointing operation which is at least one of the first operation and the second operation with respect to the displayed file information, print data having a data form interpretable by the printer based on the print object data included in the print file corresponding to file information subjected to the pointing operation, and transmit the print data as created to the printer through the communication interface.

13 Claims, 7 Drawing Sheets

<LABEL DATA TABLE>

| FILE NAME | SIZE/COLOR OF LABEL | CREATION DATE | LAST UPDATE | LAST PRINT | STATUS |
|---|---|---|---|---|---|
| AAA | 12mm | 2016/12/01 | 2016/12/01 | 2016/12/01 | EDITABLE |
| BBB | 6mm/WHITE | 2017/01/12 | 2017/01/12 | N/A | EDITABLE |
| CCC | 9mm/RED | 2015/06/06 | 2015/06/06 | N/A | EDITABLE |
| DDD | 6mm/WHITE | 2017/01/05 | 2017/01/05 | 2017/01/05 | IN-EDIT (PC1) |

PRINT CONTROLLING DEVICE CONFIGURED TO DETECT AN OPERATION THERETO AND TRANSMIT PRINT DATA, PRINT CONTROLLING METHOD, AND NON-TRANSITORY COMPUTER-READABLE RECORDING MEDIUM STORING INSTRUCTIONS THEREFOR

CROSS-REFERENCE TO RELATED APPLICATIONS

This application claims priority under 35 U.S.C. § 119 from Japanese Patent Application No. 2017-072820 filed on Mar. 31, 2017. The entire subject matter of the application is incorporated herein by reference.

BACKGROUND

Technical Field

The present disclosures relate to a technique of controlling printing operations of a printer.

Related Art

There has been known a so-called label printer, which is configured to print images on a tape-like printing medium. Typically, a conventional label printer is configured such that a user can select a character string and/or a template to be printed from among multiple candidates.

SUMMARY

According to the conventional printer as described above, the user needs to select a character string to be printed from among multiple candidates, and further a template to use from among multiple candidates. Therefore, the user is required to perform troublesome operations before execution of printing.

According to aspects of the present disclosures, there is provided a non-transitory computer-readable recording medium containing computer-readable instructions for an information processing device which has a display, a touch panel configured to discriminatively detect a first operation and a second operation applied by a pointing body to the touch panel, the first operation being an operation of at least one of contacting and approaching the pointing body to the touch panel, the second operation being an operation of applying load, by the pointing body, equal to or greater than a particular threshold load value to the touch panel, a communication interface configured to communicate with a printer, and a controller, the information processing device being configured to display a start-up icon on the display, the instructions being executed by the controller in response to operation to the start-up icon. The instructions cause, when executed by the controller, the information processing device to perform obtaining a print file including print object data in accordance with a particular obtaining condition in response to application of the second operation to the start-up icon, displaying file information which is at least a part of information included in the obtained print file, in response to a pointing operation which is at least one of the first operation and the second operation with respect to the displayed file information, creating print data having a data form interpretable by the printer based on the print object data included in the print file corresponding to file information subjected to the pointing operation, and transmitting the created print data to the printer through the communication interface.

According to aspects of the disclosures, there is provided a print controlling device, which is provided with a display, a touch panel configured to discriminatively detect a first operation and a second operation applied by a pointing body to the touch panel, the first operation being an operation of at least one of contacting and approaching the pointing body to the touch panel, the second operation being an operation of applying load, by the pointing body, equal to or greater than a particular threshold load value to the touch panel, a communication interface configured to communicate with a printer, and a controller. The controller being configured to execute obtaining print file including print object data in accordance with a particular obtaining condition in response to application of the second operation to the start-up icon, displaying file information which is at least a part of information included in the obtained print file, in response to a pointing operation which is at least one of the first operation and the second operation with respect to the displayed file information, creating print data having a data form interpretable by the printer based on the print object data included in the print file corresponding to file information subjected to the pointing operation, and transmitting the created print data to the printer through the communication interface.

According to aspects of the present disclosures, there is provided a print controlling method of controlling an information processing device which has a display, and a touch panel configured to discriminatively detect a first operation and a second operation applied by a pointing body to the touch panel, the first operation being an operation of at least one of contacting and approaching the pointing body to the touch panel, the second operation being an operation of applying load, by the pointing body, equal to or greater than a particular threshold load value to the touch panel. The method includes obtaining print file including print object data in accordance with a particular obtaining condition in response to application of the second operation to the start-up icon, displaying file information which is at least a part of information included in the obtained print file, in response to a pointing operation which is at least one of the first operation and the second operation with respect to the displayed file information, creating print data having a data form interpretable by the printer based on the print object data included in the print file corresponding to file information subjected to the pointing operation, and transmitting the created print data to the printer through the communication interface.

BRIEF DESCRIPTION OF THE ACCOMPANYING DRAWINGS

FIG. 2 shows an example of a label data table stored in a server of the printing system shown in FIG. 1.

Figure 1:
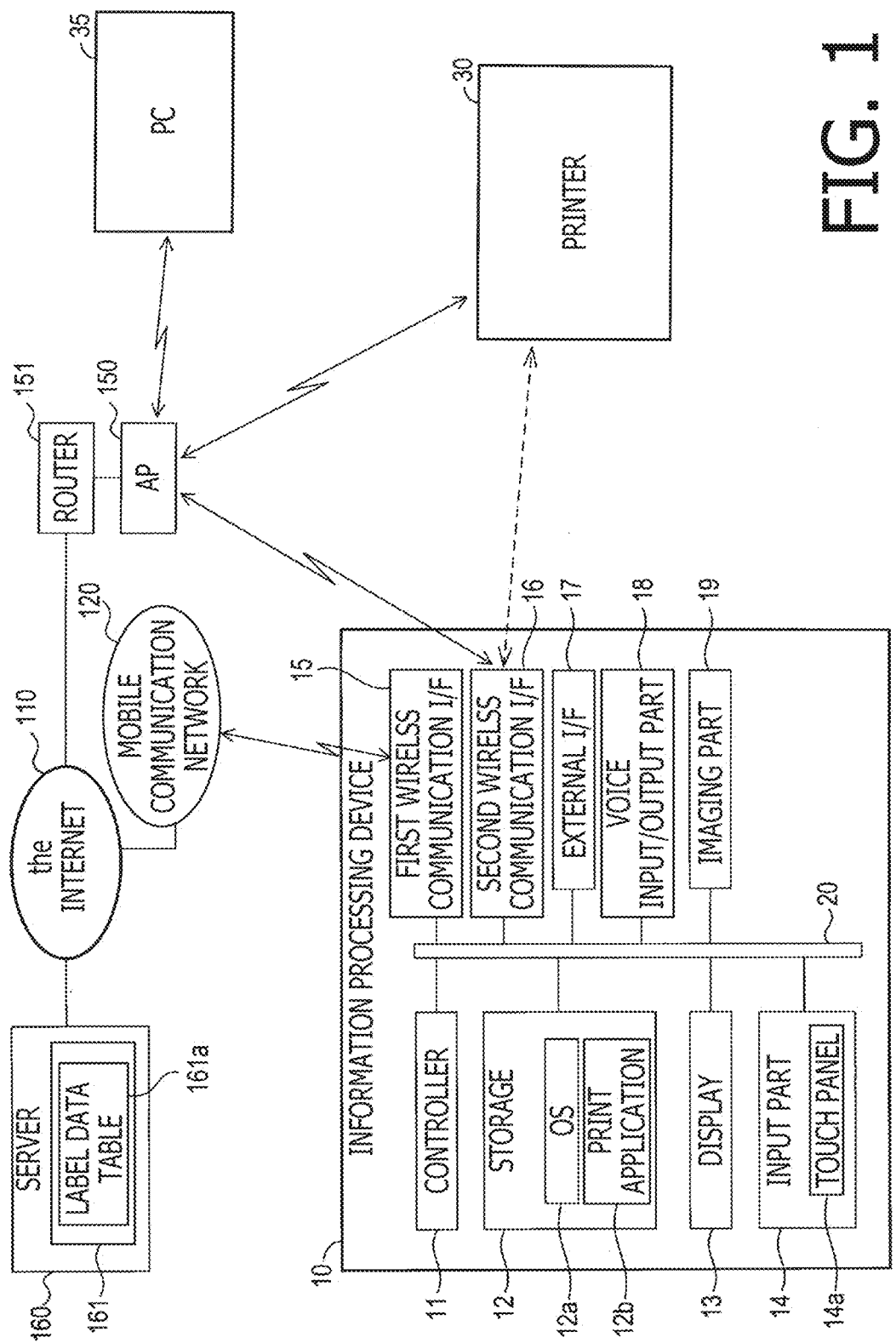
FIG. 1 is a block diagram illustrating a configuration of a printing system according to an illustrative embodiment of the present disclosures.
Figure 3:
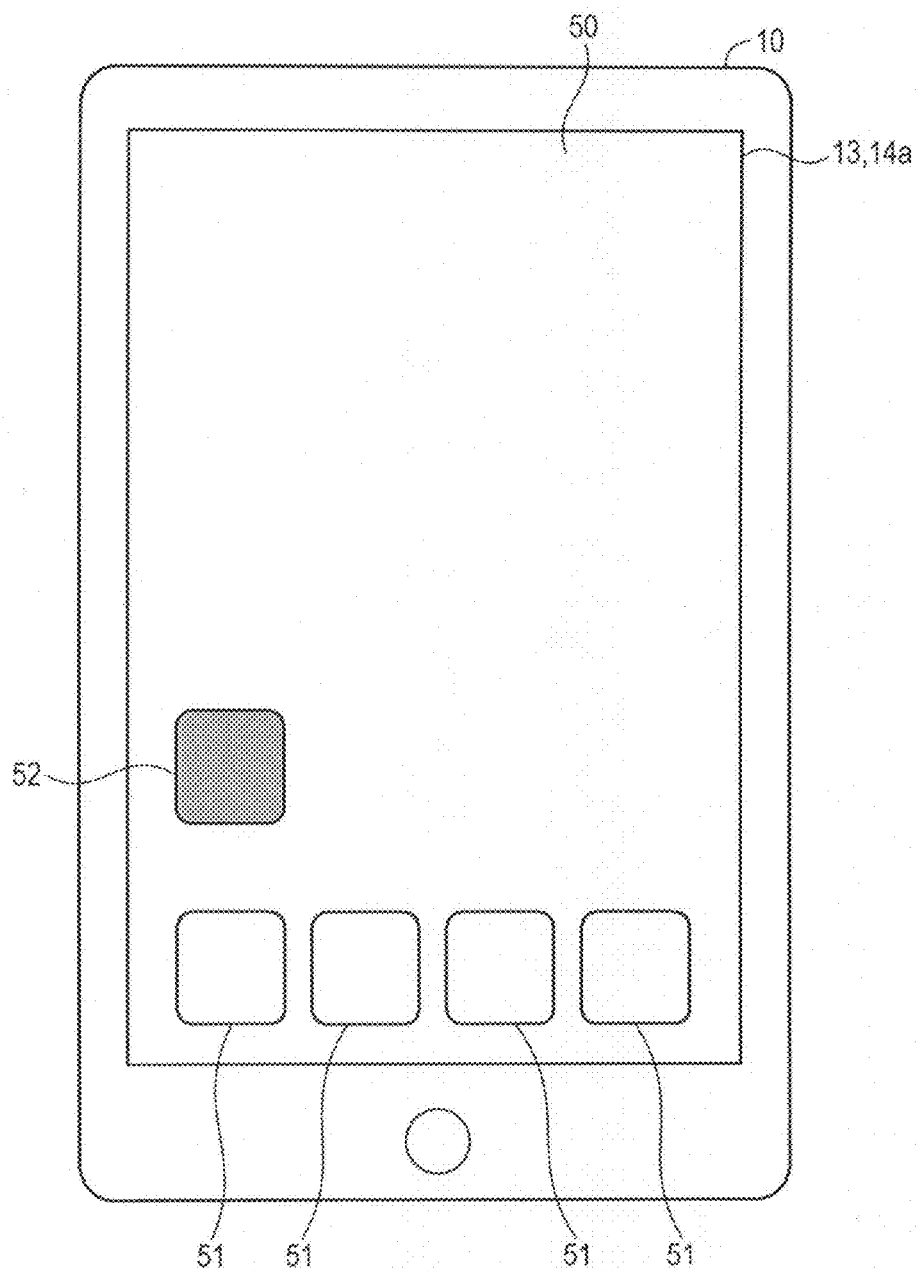

FIG. 3 schematically shows an intimal state of a standby screen displayed on a display of an information processing device of the printing system shown in FIG. 1.

Figure 4A:
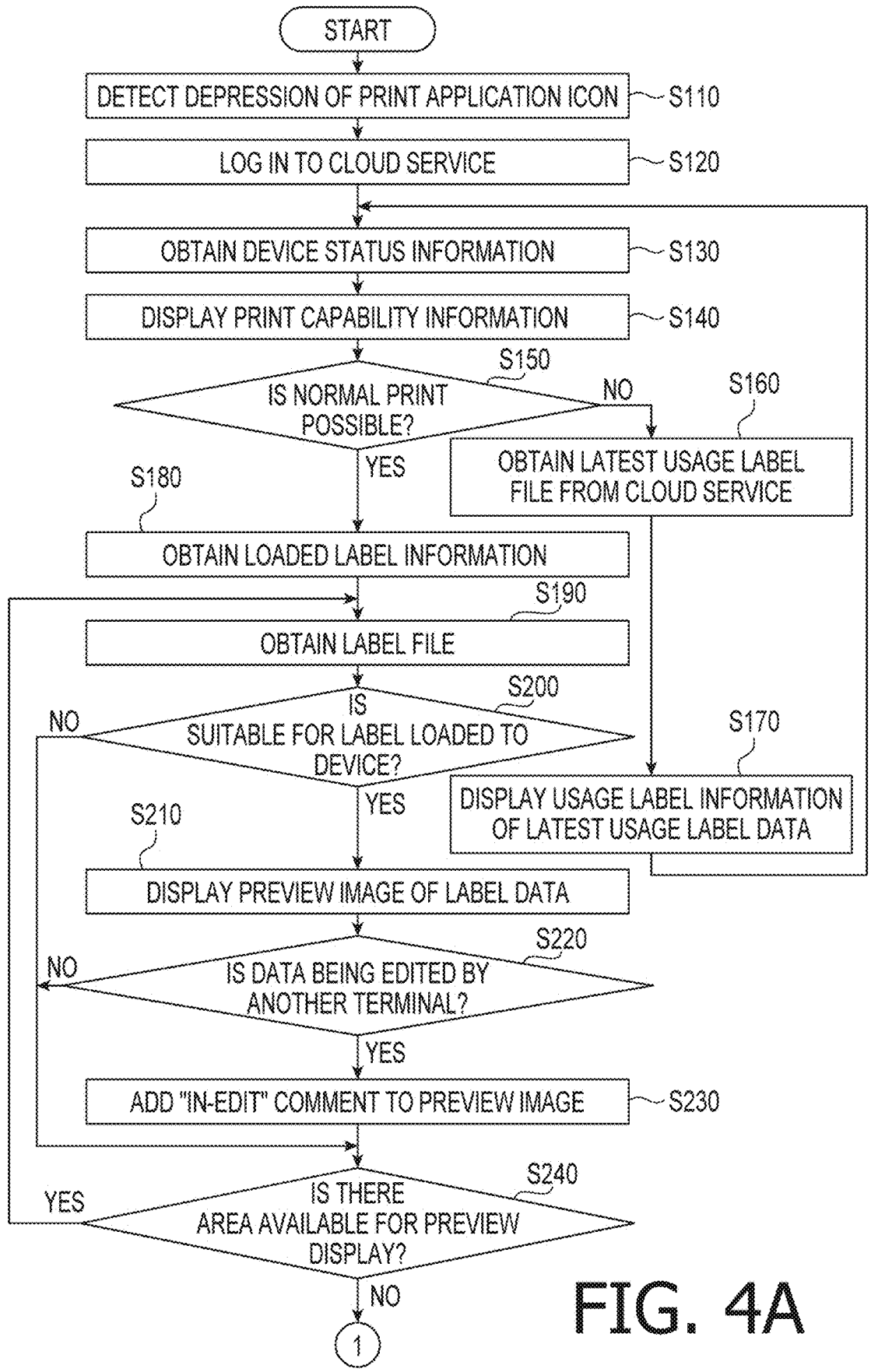
Figure 4B:
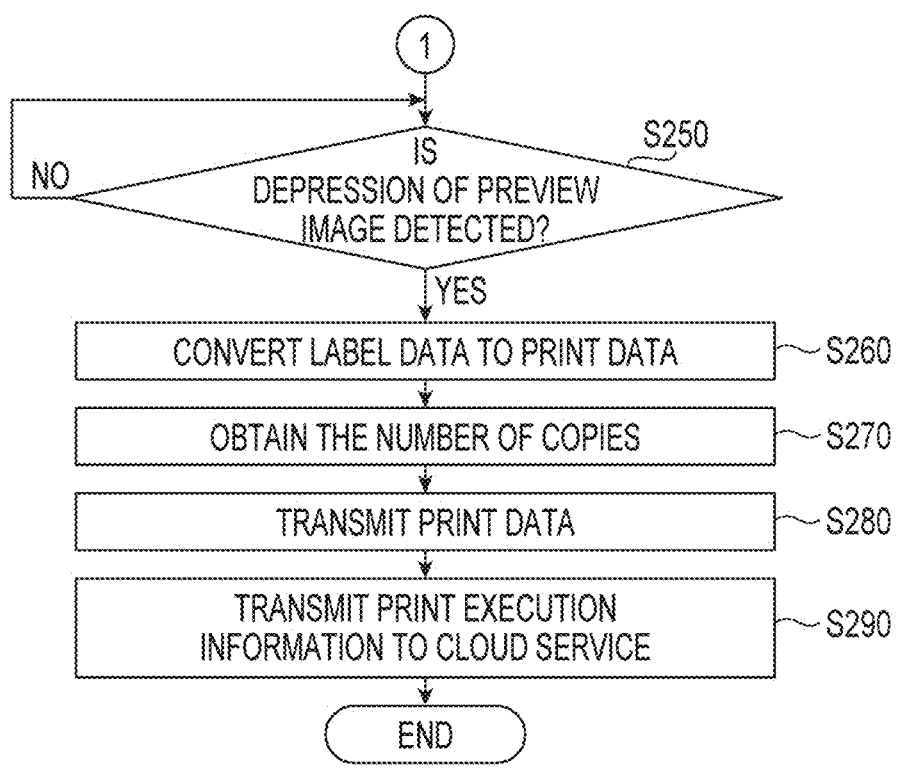

FIGS. 4A and 4B show a flowchart illustrating a simple print controlling process executed in the information processing device.

Figure 5:
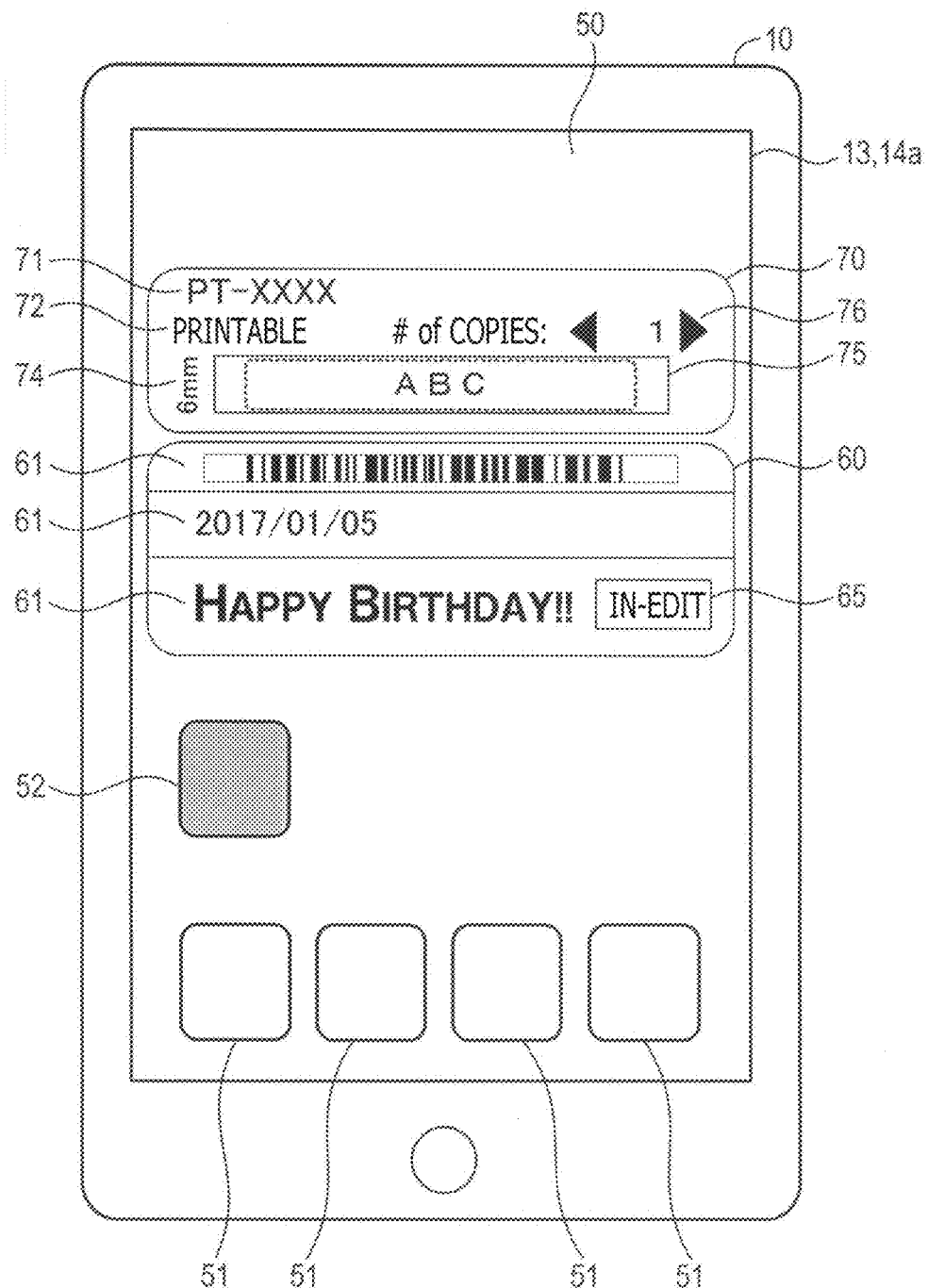

FIG. 5 shows the standby screen of the information processing device in a state where a preview image of label data obtained from the server is displayed.

Figure 6:
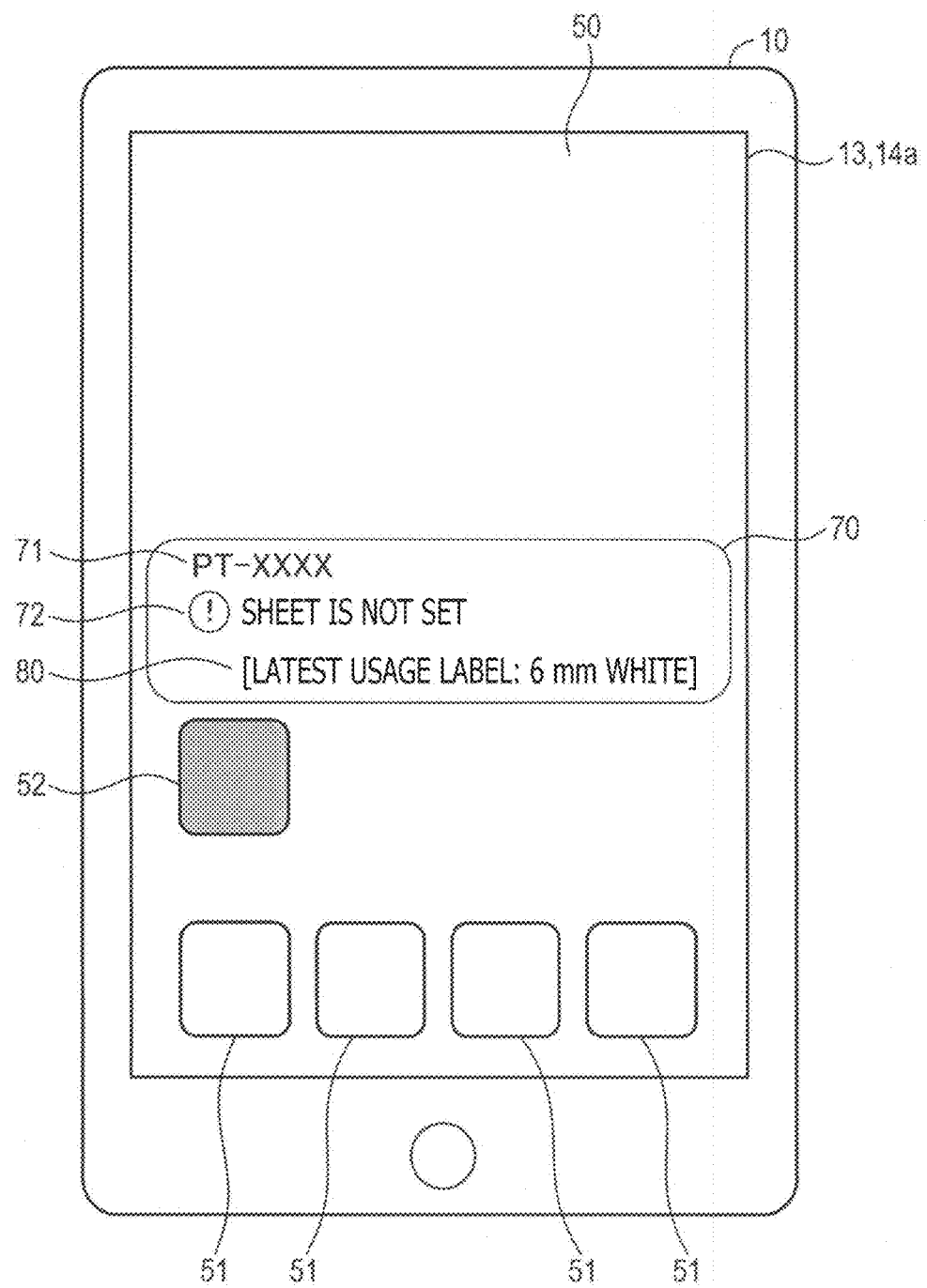

FIG. 6 shows the standby screen of the information processing device in a state where information indicating that the printer is currently in an unprintable state.

DETAILED DESCRIPTION OF THE ILLUSTRATIVE EMBODIMENTS

1. Illustrative Embodiment (1-1) Configuration of Printing System

As shown in FIG. 1, a printing system according to the present disclosures includes an information processing device 10 and a printer 30. The information processing device 10 is, for example, a mobile terminal capable of executing a wireless communication, such as a smartphone, a tablet terminal and the like. It is noted that the "mobile terminal" is only an example of the information processing device 10, and the information processing device 10 could be of various types.

The information processing device 10 includes a controller 11, a storage 12, a display 13, an input part 14, a first communication I/F 15, a second communication I/F 16, an external I/F 17, a voice input/output part 18 and an imaging part 19. The components above are interconnected through a bus line 20 such that a communication signal can be transmitted/received among the components.

According to the illustrative embodiment, the controller 11 has a CPU. The storage 12 includes semiconductor memory such as a ROM, a RAM, an NVRAM and a flash memory. That is, the information processing device 10 includes a microcomputer provided with the CPU and the semiconductor memory.

The controller 11 realizes various functions by executing programs stored in a non-transitory recording medium. According to the illustrative embodiment, the storage 12 is an example of the non-transitory recording medium storing the programs, or computer executable instructions. Various functions the information processing device 10 has can be realized, basically, as the controller 11 executes respective programs stored in the storage 12. It is noted that the functions realized by the controller 11 are not necessarily be realized by execution of the respective programs. A part of or all the functions may be realized with used of a plurality of hardware.

The storage 12 stores various pieces of software and data. According to the illustrative embodiment, the storage 12 stores, as software, an OS (operating system) 12a and a print application 12b. The OS 12a and the print application 12b are installed in a computer system including the controller 11.

It is noted that, in the following description, the controller 11 (or, a not-shown CPU provided to the controller 11) executing a certain program will be referred to simply by the name of the program. For example, depending on the context, an expression "the print application 12 does . . . " may be used to mean "the controller 11 (or the CPU) executing the print application does . . . ".

The print application 12b has a function of transmitting print data representing print object data to be printed to the printer 30, and causing the printer 30 to print the print object data by transmitting a command to print the same. Hereinafter, such a function will be referred to as a "print controlling function". Further, the print application 12b has a server communication function of accessing a server 160 to obtain information stored in the server 160 and/or transmitting information to the server 120.

The display 13 has a device configured to display an image such as a liquid crystal display or an organic EL display. The input device which the input part 14 has includes a touch panel 14a. The touch panel 14a is arranged on an image display area of the display device of the display 13.

The touch panel 14a is an input device configured to detect a pointing operation with a pointing body such as fingertip and/or a touch pen, to point a position thereon within an area corresponding to an image display area of the display 13. The expression "the pointing body points a position" means at least "the pointing body contacts a position" or "the pointing body is located in proximity to a position". That is, the touch panel 14a may be configured to detect, as the pointing operation with the pointing body, only one of a contact of the pointing body to a position and location of the pointing body in proximity to a position, or both.

When the pointing operation using the pointing body is performed, the touch panel 14a outputs an operation detection signal indicating a position at which the pointing operation is performed. When the touch panel 14a is configured to detect contact of the pointing body, the touch panel 14a outputs a pointing detection signal. When the touch panel 14a is configured to detect the location in proximity to the touch panel 14a, the touch panel 14a outputs the pointing detection signal indicating the position to its proximity the pointing body is located, or the position on the touch panel 14a at which the touch panel 14a detects the location in proximity thereto.

Further, the touch panel 14a according to the illustrative embodiment is configured to detect a load applied to the touch panel 14a by the pointing body (hereinafter, referred to as pointing body load) when the pointing body contacts the touch panel 14a. Specifically, when the pointing body load is equal to or greater than a particular threshold load value, the touch panel 14a is configured to output a pointing detection signal including load information indicating that the pointing body load is equal to or greater than a threshold load value. The above configuration may be modified such that the touch panel 14a always makes the information representing the pointing body load included the pointing detection signal regardless whether or not the pointing body load is equal to or greater than the threshold load value.

It is noted that the pointing body load may be defined by a force (unit: N), a pressure (unit: Pa) or any other physical value according to another metric system. In the following description, the pointing operation will be categorized into a normal pointing operation and a press-pointing operation. The normal pointing operation is at least one of operation to make the pointing body contact the touch panel 14a at a load less than the threshold load value and an operation to locate the pointing body in proximity to the touch panel 14a (i.e., to approach the pointing body to the touch panel 14a). The press-pointing operation is an operation to make the pointing body contact the touch panel 14a at a load equal to or greater than the threshold load value.

The controller 11 detects whether the normal pointing operation is performed, the press-pointing operation is performed, a position at which the pointing operation, if performed, is performed and the like, based on the pointing detection signal output by the touch panel 14a.

The print application 12b obtains pointing body information indicating the above detection results detected by the OS 12a therefrom, and determines whether the normal pointing operation is performed, whether the press-pointing operation is performed, and the position at which the pointing operation, if performed, is performed and the like, based on the pointing body information. It is noted that the above determination may be made by the OS 12a, and the OS 12a may transmit the determination results to the print application 12b.

When the pointing operation with the pointing body is being performed and a position pointed by the pointing body changes, the print application 12b determines movement of the pointing body based on a changing state of the pointing body. For example, the print application determines at least one of a moving amount, a moving speed, a moving acceleration and a moving direction of the pointing body. The moving amount is obtained by, for example, calculating a changing amount of the location of the pointing body obtained from the OS 12a. The moving speed can be obtained by calculation a time change rate of the moving amount of the pointing body. The moving acceleration is obtained, for example, based on a time change rate of the moving speed. The print application 12b determines the movement of the pointing body as described above, and based on the determined movement of the pointing body, detects various operations such as tapping, dragging, clicking and the like using the pointing body. The above-described detection may also be executed by the OS 12a, and the OS 12a may transmit the detection results to the print application 12b.

The external I/F 17 is an interface to which a rewritable non-volatile recording medium (not shown) is attached, and the external I/F 17 controls writing/reading of data with respect to the attached recording medium. The voice input/output part 18 is a voice input/output device provided with, for example, a microphone and a speaker. The imaging part 19 servers as a so-called digital camera, and is configured to photograph an image and generate image data representing the photographed image. The image data photographed by the imaging part 19 is, for example, stored in the storage 12.

The first wireless communication I/F 15 is an interface for performing a voice communication and a data communication through a mobile communication network 120. The first wireless communication I/F 15 may be configured to perform a wireless communication in accordance with an LTE (Long Term Evolution) standard.

The second wireless communication I/F 16 is an interface for performing a communication (hereinafter, referred to as a LAN communication) in accordance with a wireless LAN standard. According to the illustrative embodiment, the wireless LAN communication the second wireless communication I/F 16 performs is a wireless LAN communication in accordance with the IEEE 802.11b/g/n standard.

The information processing device 10 is configured to perform the wireless LAN communication with an AP (Access Point) 150 through the second wireless communication I/F 16. The AP 150 is a relaying device configured to relay the wireless LAN communication.

The information processing device 10 is configured to perform the wireless LAN communication with the printer 30 through the AP 150. It is noted that the information processing device 10 may be configured to perform the wireless LAN communication with the printer in an ad hoc mode, without the AP 150.

The AP 150 is connected to the Internet through a router 151. Therefore, the information processing device 10 can be connected to the Internet 110 through the AP 150 and the router 151. The information processing device 10 can also be connected to the Internet 110 through the first wireless communication I/F 15 and the mobile communication network 120.

To the Internet 110, at least a server 160 is connected. The information processing device 10 is configured to perform data communication with the server 160, which is connected to the Internet 110, through the first wireless communication I/F 15 or the second wireless communication I/F 16.

The server 160 is provided, for example, by a vender of the printer 30. The server 160 is configured to provide various cloud services, through the Internet 110, to various devices including the information processing device 10 and the printer 30.

The printer 30 has a printing mechanism employing, for example, a thermal-transfer technique, a thermosensitive printing technique, an inkjet printing technique, an electrophotographic imaging technique or the like. The image represented by the print data input to the printer 30 is printed onto a printing medium by the printing mechanism.

The printer 30 is configured as a so-called label printer. Accordingly, the printing medium on which the printer 30 print images includes an elongated tape-like label or a sheet type label. Such a label is typically configured such that one of front/back surfaces is a printing surface, while adhesive agent is spread on the other surface so that the label is attached to an object.

There are variety of specifications regarding labels which can be loaded to the printer 30. For example, given that a term "label size" defining a width of a label, there are multiple types of specifications of labels of which label sizes are different from each other. Further, the printer 30 can use multiple kinds of specifications of labels having different label colors.

The printer 30 is configured to perform the wireless LAN communication with various devices including the information processing device 10 and a PC 35 (described later) through the AP 150, or not through the AP 150 (i.e., directly to a target device).

Further, as shown in FIG. 1, the printing system according to the illustrative embodiment includes the PC 35, which is configured to perform data communication through the wireless LAN in the ad hoc mode without (i.e., not through) the AP 150, and accordingly, the PC 35 is capable of performing data communication with the printer 30 and/or the server 160.

It is noted that the print application 12b installed in the information processing device 10 or application software having the same functions as realized by the print application 12b is installed in the PC 35. Accordingly, the PC 35 has the print controlling function and the server communication function which the print application 12b has.

(1-2) Print Application and Label Data Table

In a storage device 161 provided to the server 160, a label data table 161a shown in FIG. 2 is stored. It is noted that print object data which can be printed by various printers including the printer 30 will be referred to as the label data. It is noted that the user can create the label data using the print application 12b.

The print application 12b has, for example, fixed form sentence data base which can be used when the label data is created. The fixed form sentence data is the label data in which various fixed form sentences such as "no smoking", and "no trespassing" are stored, in advance, in a designed manner. The user can select desired ones of the fixed form sentences from the fixed form sentence data and make the printer 30 print the selected sentences. Further, the print application 12b has, for example, template data which can be used when the label data is created. The user can create label data by selecting a desired one from among multiple templates registered in the template data and inputting texts in the selected template, and make the printer 30 to print the thus created label data. The user is also allowed to input texts without using a template, to create label data, and make the printer 30 to print the created label data. Furthermore, the user may obtain label data from another database, and cause the printer 30 to print the same.

Among the cloud services the server 160 is configured to provide, a label data service is included. According to the label data service, the label data to be printed by the printer 30 can be stored in the storage 161 of the server 160 and/or the label data stored in the storage 161 of the server 160 can be provided to the printer 30.

The label data table 161a is prepared for individual user. By log in to the label data service provided by the server 160, the user can access the label data table 161a dedicated to the user, and used the label data service targeted to the label data table 161a.

It is noted that the above-described configuration that the label data table 161a is prepared for individual user is an only an example, and the label data table 161a shared by unspecified number of users may also be prepared. In such a case, the user may use the label data service targeting both the label data table 161a for the user and the other label data table for the unspecified number of users.

As shown in FIG. 2, label information (i.e., a label data record) is registered in the label data table 161a for each piece of the label data. Each piece of label information (i.e., each label data record) contains data of a file name, a label size, a label color, a creation date, a last update (i.e., a date of last update), a last print (i.e., a date of last print) and a status. The creation date is the date the label data is firstly created. The last update is the date when the label data is updated lastly. The last print is the date when the label data is printed lastly by the printer 30. The status indicates whether the label data is currently being edited or not.

In FIG. 2, the status of a record (i.e., label data) corresponding to a file "DDD" is indicated to be "IN-EDIT (PC1)". This indication means that the label data is being edited by a user of a PC1 (not shown). That is, the user of the PC1 accesses the server 160, and is currently editing the label data of which file name is "DDD" stored in the storage 161. It is noted that an indication of "EDITABLE" in the status columns means the label data is editable but not being currently edited.

It is noted that FIG. 2 shows an example in which four pieces of label data of which file names are "AAA", "BBB", "CCC" and "DDD", respectively are registered in the label data table 161a. Although, the label data itself is not shown in FIG. 2, four pieces of label data are associated with the four pieces of label information (i.e., four label data records) of the label data table 161a, and stored in the storage 161 of the server 160. Because of the above configuration, it is possible to regard that the corresponding pieces of label data are registered for respective pieces of label information in the label data table. That is, it is possible to regard that each piece of label data is registered with corresponding piece of label information (i.e., each label data record) in the label data table 161a. Therefore, in the following description, each piece of the label data and the corresponding piece of the label information registered in the label data table 161a will be collectively referred to a label file. According to the example shown in FIG. 2, four label files respectively corresponding to the file names of "AAA", "BBB", "CCC" and "DDD" are registered in the label data table 161a.

The user of the information processing device 10 can use the label data service provided by the server 160 with use of the print application 12b. That is, the user registers the label data, which is printed by the printer 30, in the label data table 161a as print history by transmitting the label data to the server 160 with use of the print application 12b. Practically, every time when the print application 12b transmits the label data to the printer 30 for printing, the print application 12b also transmits the label data subject to printing and execution information including information regarding printing to the server 160. The execution information includes, for example, information indicative of a file name of the label data used for printing and the label size and the label color, information indicative of a timing (date of printing in the illustrative embodiment) when the printing is executed.

When the label data and the execution information are received from the information processing device 10, the server 160 updates the label data table 161a based on the received information. For example, when the received label data has not yet been registered in the label data table 161a, the server 160 newly registers the label data in the label data table 161a. When the label data having the same file name of the received label data has already been registered in the label data table 161a, the server 160 updates the label information (e.g., the last print date) corresponding to the label data in the label data table 161a.

Further, with use of the print application 12b, the user can download the label data registered in the label data table 161a from the server 160 and cause the printer 30 to print the same. Further, with use of the print application 12b, the user can edit the label data registered in the label data table 161a. When the label data is edited by the user, the server 160 updates the last update date of the edited label data in the label data table 161a to the date when the label data is edited. Further, with use of the print application 12b, the user can transmit the label data created by the information processing device 10 to the server 160 to have the label data registered in the label data table 161a.

It is noted that, any devices, not limited to the information processing device 10, can access the server 160 and use the label data service provided by the server 160. For example, the user of the PC 35 can use the label data service provided by the server 160 with use of the print application 12b or equivalent application software installed in the PC 35.

It is noted that the print application 12b is configured such that, every time when the label data is transmitted to the printer 30 for printing, the print application 12b transmits the label information to the server 160, and further, the print application 12b stores print execution history of the label data in the information processing device 10. Concrete contents of the print execution history are, for example, the same as information registered in the label data table 161a.

(1-3) Simple Print Controlling Process

Next, the simple print controlling process which is performed as the print application 12b is executed will be described. When the information processing device 10 is powered on, and the controller 11 is started up, the OS 12a causes the display 13 to display a standby screen 50 shown in FIG. 3. In the standby screen 50, start-up icons 51 to start up multiple pieces of application software installed in the information processing device 10 are displayed, respectively.

According to the illustrative embodiment, since the print application 12b is installed, a print application icon 52, which is a start-up icon to start the print application 12b, is also displayed in the standby screen 50.

When the normal pointing operation to point the print application icon 52 is performed by the user, the OS 12a starts up the print application 12b. When the print application 12b is started in response to the normal pointing operation with respect to the print application icon 52, the print application 12b displays a particular menu screen on the display 13. The user can select anyone of the various functions provided by the print application 12b to execute through the menu screen as an origin of a selecting procedure. Among the functions provided by the print application 12b, the above-described various functions to use the label data service provided by the server 150 are included.

It is noted that there is a case where the print application 12b is started even through the normal pointing operation of the print application icon 52 is not performed. That is, when the press-pointing operation of the print application icon 52 is performed, the print application 12b is started.

When started, the print application 12b obtains, from the OS 12a, information indicating whether the print application 12b has been started in response to the normal pointing operation or the press-pointing operation. When it is determined that the print application 12b has been started in response to the normal pointing operation, the menu screen is displayed on the display 13 as described above. When it is determined that the print application 12b has been started in response to the press-pointing operation, the print application 12b does not proceed to display the menu screen, but proceeds to execute the simple print controlling process shown in FIGS. 4A and 4B. According to the illustrative embodiment, after the print application 12b has been started by the press-pointing operation, the press-pointing operation may be released. The simple print controlling process is executed with, basically, the standby screen 50 being displayed.

When the simple print controlling process shown in FIGS. 4A and 4B is started, the print application 12b detects that the press-pointing operation of the print application icon 52 is performed (S110). Then, the print application 12b obtains user input of login information necessary to log in to the cloud service, and logs in to the cloud service provided by the server 160 (S120). It is noted that the "cloud service" referred to in the simple print controlling process shown in FIGS. 4A and 4B is the label data service described above.

In S130, the print application 12b obtains a device status information from the printer 30. The device status information is information indicative of whether or not the printer 30 is in a status to normally execute printing on a label. A concrete example of the device status information includes information indicating whether or not a label, on which the label data can be printed, is normally loaded to the printer 30.

In S140, the print application 12b displays print capability information 72 on the display 13 based on the device status information obtained in S130. As shown in FIGS. 5 and 6, according to the illustrative embodiment, a status display frame 70 is displayed on the display 13, and the print capability information 72 is displayed within the status display fame 70.

When it is determined that printing can be normally executed as the obtained device status information includes information indicating that the label is normally loaded, the print application 12b displays a message indicating that printing can be normally performed within the status display frame 70 as the print capability information as shown in FIG. 5. When it is determined that printing cannot be normally executed as the obtained device status information includes information indicating that the label is not normally loaded, the print application 12b displays a message indicating that printing cannot be normally performed within the status display frame 70 as the print capability information as shown in FIG. 6.

It is noted that, as shown in FIG. 6, when the printer 30 is in a state where printing cannot be normally performed, a message indicating concrete reasons why printing cannot be normally performed is displayed as the print capability information 72. This configuration may be modified such that the message directly indicates that printing cannot be performed.

In S140, the print application 12b displays, within the status display frame 70, device name information 71 indicating a name of the printer 30 in addition to the print capability information. In S150, the print application 12b determines whether the printer 30 is in a state where printing can be performed normally. When it is determined that the printer 30 is in a state where printing cannot be performed normally, the printing application 12b advances the process to S160. In S160, the print application 12b obtains a label file of latest usage label data from the cloud service provided by the server 160. Specifically, the print application 12b refers to the last print dates of respective records in the label data table 161a, and obtains the label file of the label data of which the last print date is the latest. In the example shown in FIG. 2, the label file of the label data of which file name is "DDD" is obtained.

In S170, the print application 12b displays used label information 80 indicating specification of the label which is the latest used label for printing the label data within the status display frame 70 as shown in FIG. 6. The used label information 80 is, for example, the information indicating the label size and the label color. After execution of S170, the print application 12b returns the process to S130.

It is noted that, when it is determined that the printer 30 is in a state where printing cannot be performed normally (S150: NO), the print application 12b may determine the label data of which used label information 80 is to be displayed within the status display frame 70 in S170 in accordance with a particular display condition. According to the illustrative embodiment, the particular condition defines the latest printed label data. However, the display condition may be modified to define the date of last update is the latest. In such a case, in the example shown in FIG. 2, the used label information 80 of the label data of which file name is "BBB" is displayed within the status display frame 70.

When it is determined that the printer 30 is in a state where printing can be performed normally (S150: YES), the print application 12b advances the process to S180. In S180, the print application 12b obtains loaded label information from the printer 30. The loaded label information is information indicating specification of the label currently loaded to the printer 30, and includes information on the label size and the label color.

In S190, the print application 12b obtains one label file from the label data table 161a stored in the server 160 in accordance with a particular obtaining condition. The obtaining condition can be set arbitrarily. It is now defined that one of a timing when the label data was created, a timing when the label data was printed by the printer 30, and a timing when the label file is updated is a decision timing. According to the illustrative embodiment, the obtaining condition is defined to obtain the label file of which decision timing is the latest from among the label files which have not been obtained. It is noted that the timings above are defined by year, month and date according to the illustrative embodiment.

Therefore, the decision timing is, for example, the timing at which the label data was printed, the label file of which file name is "DDD" is obtained in the example shown in FIG. 2. Then, when the process moves from S240 to S190, the label file of which name is "AAA" is obtained.

In S200, the print application 12b determines whether the label data included in the label file obtained in S190 is suitable to the label currently loaded to the printer 30. When, for example, the label size and the label color included in the obtained label file are coincident with the label size and the label color of the label currently loaded to the printer 30, the print application 12b may determine that the label data included in the label file obtained in S190 is suitable to the label currently loaded to the printer 30 (S200: YES). Oppositely, when at least one of the label size and the label color included in the obtained label file is not coincident with the label size or the label color of the label currently loaded to the printer 30 and the printer 30 cannot perform printing normally, the print application 12b may determine that that the label data included in the label file obtained in S190 is not suitable to the label currently loaded to the printer 30 (S200: NO).

When it is determined that the label data is not suitable (S200: NO), the print application 12b advances the process to S240. When it is determined that the label data is suitable (S200: YES), the print application 12b advances the process to S210. In S210, the print application 12b displays a preview image 61 of the label data included in the label file obtained in S190 on the display 13. Concretely, as shown in FIG. 5, the print application 12b displays a preview display frame 60 on the display 13, and the preview image 61 of the label data within the preview display frame 60. FIG. 5 shows a state where the preview images 61 of three different label files are vertically arranged within the preview display frame 60.

In S210, it is possible, as shown in FIG. 5, that the print application 12b may also display label size information 74 and label color information 75 respectively indicating the label size and the label color of the label loaded to the printer 30 based on the loaded label information obtained in S180 within the status display frame 70.

Further, as shown in FIG. 5, that the print application 12b also displays a circulation setting field 76 allowing the user to set the number of copies (i.e., circulation) to be printed by the printer 30 within the status display frame 70. The user can set the number of copies by performing instructing operation with respect to the circulation setting field 76 displayed within the status display frame 70.

In S220, the print application 12b determines, based on the status information included in the label file obtained in S190, whether the label file registered in the label data table 161a of the server 160 is currently being edited by a terminal device other than the information processing device 10. When the label file in the server 160 is not currently being edited (S220: NO), the print application advances the process to S240. When the label file in the server 160 is currently being edited (S220: YES), the print application 12b advances the process to S230. In S230, as shown in FIG. 5, the print application 12b displays in-edit information 65 within the corresponding preview image 61.

When the in-edit information 65 is displayed, the user may stop the currently executed process applied to the corresponding label file, and extinguish the preview image 61 of the corresponding label file from the display 13 by, for example, performing an instruction operation with respect to the in-edit information. In such a case, the print application 12b may return the process to S190 and obtain a new label file in accordance with an obtaining condition.

In S240, the print application 12b determines whether a displayable area in which a new preview image 61 can be additionally displayed in the display 13. The displayable area here includes all the areas where the preview display frame 60 or the status display frame 70 has not yet been displayed, including the area where the start-up icons 51 are displayed.

According to the illustrative embodiment, one preview image 61 is displayed for one label file. Further, according to the illustrative embodiment, at least three is regarded as the upper limit of the number of label files, and the print application 12b displays respective preview images 61 simultaneously.

When it is determined that the displayable areas are still remained (S240: YES), the print application 12b returns the process to S190. When it is determined that no displayable area is remained (S240: NO), the print application 12b advances the process to S250. In S250, the print application 12b determines whether the press-pointing operation with respect to the preview image 61 is detected. Unless the press-pointing operation with respect to the preview image 61 is detected (S250: NO), the print application 12b repeats S250. When the press-pointing operation with respect to the preview image 61 is detected (S250: YES), the print application 12b advances the process to S260. It is noted that the pointing operation subjected to be detected may not be the press-pointing operation but the normal pointing operation.

In S260, the printer application 12b converts the label data corresponding to the preview image 61 to which the press-pointing operation is applied in S250 to the print data having data form which can be interpreted by the printer 30. That is, the print application 12b generates the print data to be transmitted to the printer 30 based on the label data.

In S270, the print application 12b obtains the setting value of the number of copies based the setting state of the circulation setting field 76 within the status display frame 70. In S280, the print application 12b transmits the print data generated in S260 to the printer 30 together with the corresponding label information and the setting value of the number of copies obtained in S270. Thereby, in the printer 30, printing based on the print data is performed. At that time, printing according to the number of copies indicated by the setting value of the number of copies transmitted in S280 is executed.

In S290, the print application 12b transmits the print execution information to the cloud service. Concretely, the print application 12b transmits print execution information including at least the file name of the label data printed by the printer 30 and information indicating the timing when printing was executed to the cloud service. Accordingly, in the server 160, the contents of the label data table are updated. For example, when the label data of which file name is "DDD" is printed by the printer 30, the last print date of the label information of which file name is "DDD" in the label data table 161a is updated.

(1-4) Effects of Illustrative Embodiment

According to the illustrative embodiment described above, effects (1a)-(1f) below are achieved.

(1a) With the print application 12b according to the illustrative embodiment, the user can display a preview image of the label data obtained in accordance with the obtaining condition by applying the press-pointing operation to the print icon 52. Then, by applying the instruction operation to the preview image 61, it is possible to cause the printer 30 to print the label data of which preview image is being displayed. Accordingly, it is possible to reduce the user's labor in making the printer 30 print the label data.

(1b) In S190, the label file is obtained in accordance with the obtaining condition. The obtaining condition according to the illustrative embodiment is to obtain the label file of which decision timing is the latest from among the label files which have not been obtained yes. It is assumed that the label data of which decision timing is the latest is very likely the label data the user intends to print in comparison with label data of which decision timings are old. Therefore, by display the preview images 61 of the label data on a priority basis, it is possible to provide the user of the user-desired label data quickly.

(1c) According to the above-described embodiment, even if the label file is obtained in S190, the preview image 61 of the label data in the obtained label file is not always displayed. According to the illustrative embodiment, after the label file is obtained, it is further determined whether the label data in the obtained label file is suitable to the label currently loaded to the printer 30, and only when it is determined to be suitable, the preview image 61 of the label data of the obtained label file is displayed. Therefore, the user can obtain the label data which can be printed by the printer 30 efficiently, and display the same.

(1d) According to the illustrative embodiment, before the label file is obtained from the server 160, the device status information is obtained in S130. Then, when it is determined, based on the device status information, that the printer 30 is in a state of performing a printing operation normally, the label file is obtained from the server 160. Accordingly, the label file is appropriately obtained or not obtained based on the status of the printer 30.

(1e) When it is determined, based on the device status information, that the printer 30 is in a state that it cannot perform printing normally, the print capability information 72 indicating the printing cannot be normally performed, and the used label information 80, as shown in FIG. 6. Therefore, the user can timely recognize that the printing cannot be performed due to a problem on the printer 30 side. Further, since the used label information 80 is displayed, the user recognizes what label was used when the latest printing was performed.

(1f) When the label file obtained from the server 160 is being edited by another terminal, the in-edit information 65 is displayed as shown in FIG. 5. Accordingly, the user can determine whether it is appropriate to print the label data of which preview image is currently displayed. Then, for example, the user may determine not to print the label data which is currently edited by another terminal.

(1-5) Terms Used in the Claims

Terms used in the claims will be briefly described. The print application 12b is an example of a print controlling process. The information processing device 10 is an example a print controlling device. The second wireless communication OF 16 is an example of a communication I/F. The label file is an example of a print file. The label data included in the label file is an example of print object data. The status in the label data table shown in FIG. 2 is an example of edit execution information. The normal printing operation is an example of first operation. The press-pointing operation is an example of a second operation. The operation with respect to the detection object in S250 is an example of a pointing operation. The loaded label information obtained in S180 is an example of a printing medium information. The server 160 is an example of a storage.

The process in S130 is an example of a status information obtaining process. The process in S170 is an example of a particular information displaying process. The process in S180 is an example of a medium information obtaining process. The process in S190 is an example of a file obtaining process. The process S210 is an example of a file information displaying process. The process in S260 is an example of a print data creating process. The process in S280 is an example of a transmitting process.

2. Other Illustrative Embodiment

It is noted that the present disclosures should not be limited to the above-described configuration, but various modification can be included within the aspects of the present disclosures.

(2-1) The obtaining condition referred to in S190 to obtain the label file may include a condition to obtain the label files which are not being currently edited with higher priority than the label files which are being edited. Alternatively, before displaying the preview image in S210, the print application 12b may determine whether the label file subject to display is currently being edited in the server 160, and may display the preview image when label file subject to display is not being edited, while the print application 12b return the process to S190 to obtain another label file.

(2-2) The obtaining condition referred to in S190 to obtain the label file may include a condition that the label file is suitable to the label currently loaded to the printer 30. With such a configuration, a decision process in S200 can be omitted.

(2-3) It is noted that the preview image 61 is only an example of information to be displayed on the display 13 regarding one label file, and the types of information and display position can be determined arbitrarily. For example, for one label file, another piece of information (e.g., a file name) may be displayed in addition to the preview image 61.

It is noted that multiple label files of which number exceeds the upper limit of the simultaneously displayable number of pieces of information on the display 13. In such case, the pieces of information of the multiple label files as obtained may be changeably on the display 13 by scrolling the displayed contents in response to, for example, a flick operation using the pointing body.

(2-4) It is noted that intervention of the OS 12a in the process executed by the print application 12b is not always necessary. That is, the functions the print application 12b achieve may be performed only by the print application 12b without requiring intervention of the OS 12a. In other words, the configurations according to aspects of the present disclosures can be applied to a computer system which does not have an OS system.

(2-5) The data communication among respective devices constituting the print system need not be limited to the communication through the wireless LAN. The data communication among the respective devices may be a wireless communication method other than the wireless LAN. Further, the data communication may include a wired communication.

(2-6) It is noted that the information processing device 10 described above is only an illustrative embodiment, and aspects of the present disclosures can be applied to various information processing devices configured to execute a print controlling program, or various information processing device of which functions may be realized by hardware. It is also noted that the configuration of the printer 30 described above is also an illustrative embodiment and the aspects of the present disclosures are applicable to printers having various functions in printing images on recording media. Further, the printer 30 described above is a label printer. However, it is only an illustrative embodiment, and the printer 30 needs not be limited to the label printer according to the aspects of the disclosures.

(2-7) It is noted the above-described embodiments may be modified such that one or a plurality of functions of one of the component of the above-described embodiment may be realized by a plurality of components. Further, one or a plurality of functions realized by one component may be realized by a single component. Further, a part of the configuration of the above-described embodiments may be omitted. Further, at least a part of the configuration of the above-described illustrative embodiment may be applied to the configuration of another embodiment, or replaced with another configuration realizing the similar function. Any aspects included in technical ideas set forth the claims and the present disclosures should be regarded embodiments according to the present disclosures.

What is claimed is:

1. A non-transitory computer-readable recording medium containing computer-readable instructions for an information processing device which has a display, a touch panel configured to discriminatively detect a first-type operation and a second-type operation applied by a pointing body to the touch panel, the second-type operation being different from the first-type operation, a communication interface configured to communicate with a printer, and a controller, the information processing device being configured to display a single start-up icon on the display on a standby screen, the instructions being executed by the controller in response to at least one of the first-type operation and the second-type operation being applied to the single start-up icon, the instructions cause, when executed by the controller, the information processing device to perform:
executing a print program implemented in the information processing device in response to detection of one of the first-type operation and the second-type operation being applied to the single start-up icon displayed on the standby screen; and
obtaining information indicating whether the print program has been executed in response to the first-type operation or the second-type operation,
when the obtained information indicates that the print program has been executed in response to the first-type operation,
displaying a particular menu screen, the particular menu screen being different from the standby screen; and
in response to receiving, through the displayed particular menu screen, an executing instruction to execute a particular function, executing the particular function; and
when the obtained information indicates that the print program has been executed in response to the second-type operation, executing the particular function without displaying the particular menu screen,
when the particular function is executed, the instructions cause, when executed by the controller, the information processing device to perform:
obtaining a print file including print object data in accordance with a particular obtaining condition;
displaying file information, the file information being at least a part of information included in the obtained print file;
in response to a pointing operation which is at least one of the first-type operation and the second-type operation being applied to the displayed file information,
creating print data having a data form interpretable by the printer based on the print object data included in the print file corresponding to file information subjected to the pointing operation; and
transmitting the created print data to the printer through the communication interface.

2. The non-transitory computer-readable recording medium according to claim 1,
wherein the obtained print file is stored such that at least one print file is stored in at least one particular storage, the obtained print file including timing information, at least one of a timing when the obtained print file is generated, a timing when the print object data of the obtained print file is printed by the printer, and a timing when the obtained print file is updated,
wherein the obtained print file is obtained from the at least one storage, and
wherein the particular obtaining condition is to sequentially obtain the print files having later decision timings at higher priorities, the decision timing being the timing of one of the at least one timing information.

3. The non-transitory computer-readable recording medium according to claim 1,
wherein the instructions further cause, when executed by the controller, to the information processing device to perform:
obtaining a maximum or less number of print files, the maximum number being the number of pieces of file information simultaneously displayable on the display.

4. The non-transitory computer-readable recording medium according to claim 1,
wherein the instructions further cause, when executed by the controller, to the information processing device to obtain printing medium information indicating specification of a printing medium loaded to the printer when the second-type operation is applied with respect to the single start-up icon, and
wherein, in displaying, the file information is displayed with targeting the print file including the print object data which can be printed on the printing medium indicated by the obtained printing medium information.

5. The non-transitory computer-readable recording medium according to claim 1,
wherein the instructions further cause, when executed by the controller, to the information processing device to obtain device status information indicating whether the printer is in a printable status from the printer through the communication interface, and
wherein the print file including print object data is obtained in response to application of the second-type operation with respect to the single start-up icon when the obtained device status information includes contents indicating that printing is executable.

6. The non-transitory computer-readable recording medium according to claim 5,
wherein the instructions further cause, when executed by the controller, the information processing device to execute, when the obtained device status information includes contents indicating that the printing is not executable, displaying the file information of the print file satisfying the particular displaying condition from among the print files of which print data is transmitted from the information processing device to the printer.

7. The non-transitory computer-readable recording medium according to claim 1,
wherein the print file is stored in one particular storage, the print file being editable, the print file including edit execution information indicative of whether editing of the print file is being edited, wherein, in obtaining the print file in response to application of the second-type operation with respect to the single start-up icon, the print file is obtained from the at least one storage, and wherein, in displaying the file information, when the edit execution information included in the obtained print file indicates that the file information including in-edit information indicating that editing is being executed, file information including the in-edit information indicating editing is displayed.

8. The non-transitory computer-readable recording medium according to claim 1, wherein the instructions further cause, when executed by the controller, the information processing device to perform:

receiving a selection operation of selecting a print file on the particular menu screen;

obtaining the selected print file; and displaying file information included in the selected print file.

9. The non-transitory computer-readable recording medium according to claim 1, wherein the first-type operation is an operation of at least one of contacting and approaching the pointing body to the touch panel, and wherein the second-type operation is an operation of applying load, by the pointing body, equal to or greater than a particular threshold load value to the touch panel.

10. A print controlling device, comprising:

a display;

a touch panel configured to discriminatively detect a first-type operation and a second-type operation applied by a pointing body to the touch panel the second-type operation being different from the first-type operation;

a communication interface configured to communicate with a printer; and a controller, the controller being configured to execute:

executing a print program implemented in the information processing device in response to detection of one of the first-type operation and the second-type operation being applied to the single start-up icon displayed on a standby screen, and obtaining information indicating whether the print program has been executed in response to the first-type operation or the second-type operation, when the obtained information indicates that the print program has been executed in response to the first-type operation, displaying a particular menu screen, the particular menu screen being different from the standby screen; and in response to receiving, through the displayed particular menu screen, an executing instruction to execute a particular function, executing the particular function; and when the obtained information indicates that the print program has been executed in response to the second-type operation, executing the particular function without displaying the particular menu screen, when the particular function is executed, the controller being configured to execute:

obtaining print file including print object data in accordance with a particular obtaining condition;

displaying file information, the file information being at least a part of information included in the obtained print file;

in response to a pointing operation which is at least one of the first-type operation and the second-type operation being applied to the displayed file information creating print data having a data form interpretable by the printer based on the print object data included in the print file corresponding to file information subjected to the pointing operation; and transmitting the created print data to the printer through the communication interface.

11. A print controlling method of controlling an information processing device which has a display, and a touch panel configured to discriminatively detect a first-type operation and a second-type operation applied by a pointing body to the touch panel, the method comprising:

executing a print program implemented in the information processing device in response to detection of one of the first-type operation and the second-type operation being applied to the single start-up icon displayed on a standby screen, and obtaining information indicating whether the print program has been executed in response to the first-type operation or the second-type operation, when the obtained information indicates that the print program has been executed in response to the first-type operation, displaying a particular menu screen, the particular menu screen being different from the standby screen; and in response to receiving, through the displayed particular menu screen, an executing instruction to execute a particular function, executing the particular function; and when the obtained information indicates that the print program has been executed in response to the second-type operation, executing the particular function without displaying the particular menu screen, when the particular function is executed:

obtaining print file including print object data in accordance with a particular obtaining condition;

displaying file information, the file information being at least a part of information included in the obtained print file;

in response to a pointing operation which is at least one of the first-type operation and the second-type operation being applied to the displayed file information, creating print data having a data form interpretable by the printer based on the print object data included in the print file corresponding to file information subjected to the pointing operation; and transmitting the created print data to the printer through the communication interface.

12. The print controlling device according to claim 10, wherein the first-type operation is an operation of at least one of contacting and approaching the pointing body to the touch panel, and wherein the second-type operation is an operation of applying load, by the pointing body, equal to or greater than a particular threshold load value to the touch panel.

13. The print controlling method according to claim 11, wherein the first-type operation is an operation of at least one of contacting and approaching the pointing body to the touch panel, and wherein the second-type operation is an operation of applying load, by the pointing body, equal to or greater than a particular threshold load value to the touch panel.

* * * * *